United States Patent
Hoshina et al.

(10) Patent No.: US 7,714,476 B2
(45) Date of Patent: May 11, 2010

(54) ROTATING ELECTRICAL MACHINE CORE AND ROTATING ELECTRICAL MACHINE

(75) Inventors: Eisuke Hoshina, Toyota (JP); Toshiya Yamaguchi, Nishikamo-gun (JP); Yasuhiro Endo, Okazaki (JP); Kazutaka Tatematsu, Nagoya (JP); Yutaka Komatsu, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 196 days.

(21) Appl. No.: 12/086,003

(22) PCT Filed: Jan. 15, 2007

(86) PCT No.: PCT/JP2007/050855

§ 371 (c)(1),
(2), (4) Date: Jun. 4, 2008

(87) PCT Pub. No.: WO2007/081062

PCT Pub. Date: Jul. 19, 2007

(65) Prior Publication Data

US 2009/0085423 A1    Apr. 2, 2009

(30) Foreign Application Priority Data

Jan. 16, 2006   (JP) .............................. 2006-007338

(51) Int. Cl.
*H02K 1/18*   (2006.01)
(52) U.S. Cl. .................. 310/216.113; 310/216.008; 310/254.1
(58) Field of Classification Search .......... 310/216.008, 310/216.009, 216.057–216.059, 216.064, 310/216.067, 216.104, 216.113, 216.114, 310/216.118, 254.1
See application file for complete search history.

(56) References Cited

U.S. PATENT DOCUMENTS

| | | | |
|---|---|---|---|
| 2006/0066171 A1* | 3/2006 | Yanoi et al. | 310/254 |
| 2009/0189477 A1* | 7/2009 | Yamamoto | 310/216.058 |
| 2009/0273245 A1* | 11/2009 | Endo et al. | 310/44 |

FOREIGN PATENT DOCUMENTS

| | | |
|---|---|---|
| JP | 11-341717 A | 12/1999 |
| JP | 2001-045684 A | 2/2001 |
| JP | 2002-136013 A | 5/2002 |
| JP | 2003-088013 A | 3/2003 |
| JP | 2004-208402 A | 7/2004 |
| JP | 2004-215420 A | 7/2004 |
| JP | 2005-269717 A | 9/2005 |

* cited by examiner

*Primary Examiner*—Burton Mullins
(74) *Attorney, Agent, or Firm*—Kenyon & Kenyon LLP

(57) ABSTRACT

A core comprises a plurality of core split members having yoke portions and tooth portions and arranged in such a circumferential shape that the yoke portions contact with each other while the tooth portions being directed inward. The core further comprises a ring contacting with the yoke portions, and stoppers mounted on the outer face sides of the yoke portions for fixing the ring on the yoke portions. The yoke portions and the ring are formed in corrugated shape to mesh with each other, and the stoppers are formed with projections that engage with the inner side of the ring. This structure provides both the rotating electrical machine core having the core split members arranged in the circumferential shape and fastened to each other while preventing occurrence of a stress and a positional displacement between the core split members, and a rotating electrical machine.

4 Claims, 5 Drawing Sheets

ROTATING ELECTRICAL MACHINE CORE AND ROTATING ELECTRICAL MACHINE

CROSS-REFERENCE TO RELATED APPLICATIONS

This is a national phase application filed under 35 U.S.C 371 of PCT/JP2007/050855 filed on Jan. 15, 2007, which claims the benefit of priority from the prior Japanese Patent Application No. 2006-007338 filed on Jan. 16, 2006, the entire contents of all of which are incorporated herein by reference.

TECHNICAL FIELD

The present invention relates to a rotating electrical machine core including a plurality of core split members circumferentially arranged and a rotating electrical machine.

BACKGROUND ART

Heretofore, there has been a rotating electrical machine including core split members which are circumferentially arranged and on each of which a coil is wound in concentrated winding pattern. For such a core, for example core split members made of powder consisting primarily of iron or the like into a nearly-T shape in plan view are used. This core split member generally has a tooth portion extending in a radial direction and a yoke portion wider in a circumferential direction than the tooth portion. The predetermined number of the core split members are circumferentially arranged by making the yoke portions contact with each other to produce a nearly annular core.

Here, there is a shrink fitting method as a method of producing the core by firmly connecting the core split members circumferentially arranged to each other disclosed in for example Patent Document 1 or 2. This method is achieved by circumferentially arranging core split members and fitting a nonmagnetic ring or case heated to high temperatures around the core split members, thereby fastening the core.

Patent Document 1: JP2003-88013A
Patent Document 2: JP2002-136013A

DISCLOSURE OF INVENTION

Problems to be Solved by the Invention

However, the aforementioned conventional rotating electrical machine core has the following problems. Specifically, core split members are somewhat uneven in finished size, leading to slight variations in outer diameter after the core split members are circumferentially arranged. In some cases, a shrinking amount may become excessive. In such a case, a stress occurs in a core after the shrink fitting, which may deteriorate hysteresis loss. Alternatively, a stress occurs in a boundary area between the tooth portion and the yoke portion, which may damage a corner portion due to thermal cycles in use.

Conversely, when the shrinking amount is too small, the core may be displaced in an axial direction by vibration in use or the core and the ring may be displaced from each other in a circumferential direction. If such displacement occurs, it will adversely affect the flow of magnetic flux. To avoid the above problems, it is conceivable to measure the outer diameter of the core in an assembled state and choose a ring of an appropriate size. For this end, however, many types of rings have to be prepared. Further, addition of the step of measuring the outer diameter will cause another problem that production cost is increased.

The present invention has been made to solve the above-mentioned problems of the conventional rotating electrical machine core. Specifically, an object of the present invention is to provide a rotating electrical machine core including core split members circumferentially arranged and fastened and more particularly to a rotating electrical machine core and a rotating electrical machine capable of preventing the occurrence of stress in the core and the displacement between core split members.

Means for Solving the Problems

To achieve the above purpose, the present invention provides a rotating electrical machine core including a plurality of core split members each having a yoke portion and a tooth portion, the core split members being circumferentially arranged so that the tooth portions are oriented inward and the yoke portions are made contact with each other, the rotating electrical machine core comprising: a ring placed in contact with the yoke portions; and a stopper mounted on an outer periphery of the yoke portion to fix the ring to the yoke portion, wherein each yoke portion and the ring are formed in protrusion and recess shapes that mesh with each other, and the stopper is formed with a projection engaged with an inner side of the ring.

In the rotating electrical machine core of the invention, the plurality of core split members is circumferentially arranged and the ring and the stopper are mounted. Herein, each yoke portion and the ring are formed in corrugated shapes which mesh with each other, thereby preventing displacement from each other. The stopper is formed with the projection which is engaged with or hooked over the inner side of the ring to prevent the stopper from coming off outward. When a plurality of the stoppers are circumferentially arranged, they can be fixed stably with mutually pulling forces kept in balance. Specifically, the core split members do not need to be fastened excessively strongly and rotation displacement and axial displacement of each core split member can be prevented by the ring and the stopper. Accordingly, the rotating electrical machine core including the core split members circumferentially arranged and fastened, that is, a rotating electrical machine that prevents stress generation and positional displacement between the core split members is provided. Herein, the inner side represents a side close to the center of a circle defined by the core split members and an opposite side is an outer side.

In the present invention, preferably, the ring is placed in contact with end faces of the yoke portions, the corrugated shapes of the yoke portions and those of the ring are achieved by protrusions and recesses in the axial direction and the stopper is mounted in a position corresponding to each recess of the yoke portions. With this configuration, the corrugated shapes of the yoke portions and the ring in combination with the stoppers can reliably prevent positional displacement therebetween.

Furthermore, the present invention also provides a rotating electrical machine incorporating a rotating electrical machine core including a plurality of core split members each having a yoke portion and a tooth portion, the core split members being circumferentially arranged so that the tooth portions are oriented inward and the yoke portions are made contact with each other, the rotating electrical machine core comprising: a ring placed in contact with the yoke portions; and a stopper mounted on an outer periphery of the yoke portion to fix the ring to the yoke portion, wherein each yoke portion and the ring are formed in protrusion and recess shapes that mesh with each other, and the stopper is formed with a projection engaged with an inner side of the ring.

Effects of the Invention

According to the rotating electrical machine core and the rotating electrical machine of the invention, a rotating electrical machine incorporating a rotating electrical machine core including core split members circumferentially arranged and fastened, that is, a rotating electrical machine that prevents stress generation and positional displacement between the core split members is provided.

EXPLANATION OF REFERENCE CODES

10 Core
11 Split core element
12 Ring
13 Stopper
21 Tooth portion
22 Yoke portion

BEST MODE FOR CARRYING OUT THE INVENTION

A detailed description of a preferred embodiment of the present invention will now be given referring to the accompanying drawings. In this embodiment, the present invention is embodied as a core produced by circumferentially arranging and fastening core split members.

Figure 2:
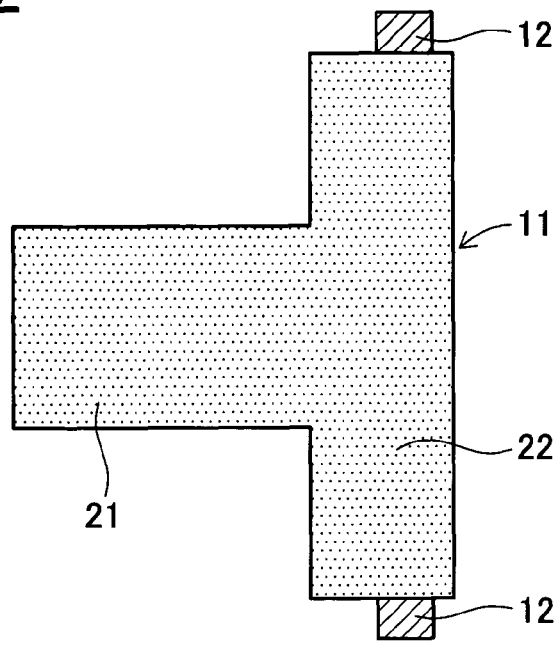
FIG. 2 is a sectional view along a line A-A in FIG. 1.
Figure 3:
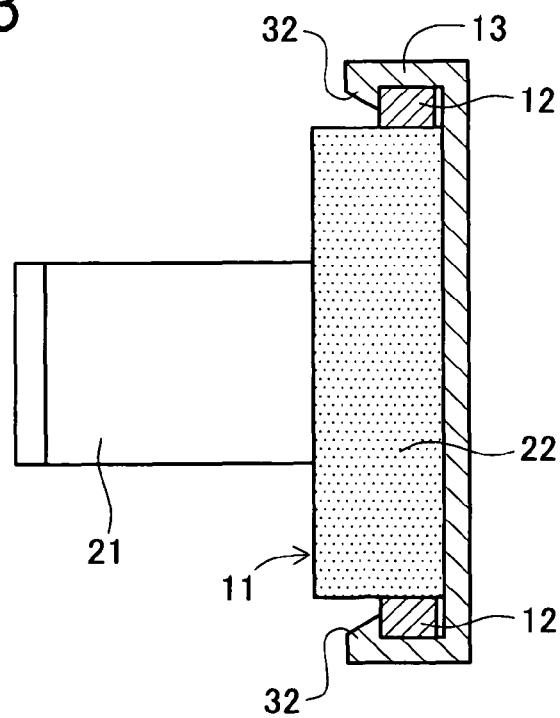
FIG. 3 is a sectional view along a line B-B in FIG. 1.

A core 10 of this embodiment includes a plurality of core split members 11 that are circumferentially arranged and fastened by use of rings 12 and stoppers 13. The rings 12 are placed one each on end faces of the core split members 11 in an axial direction. The stoppers 13 are disposed one each in boundaries between the core split members 11. FIG. 2 is a sectional view along a line A-A in FIG. 1. FIG. 3 is a sectional view along a line B-B in FIG. 1. Hereinafter, the direction of a central axis of an outer circumferential face (in nearly cylindrical shape) of the core split members 11 arranged as shown in FIG. 1 is referred to as an axial direction.

Figure 4A:
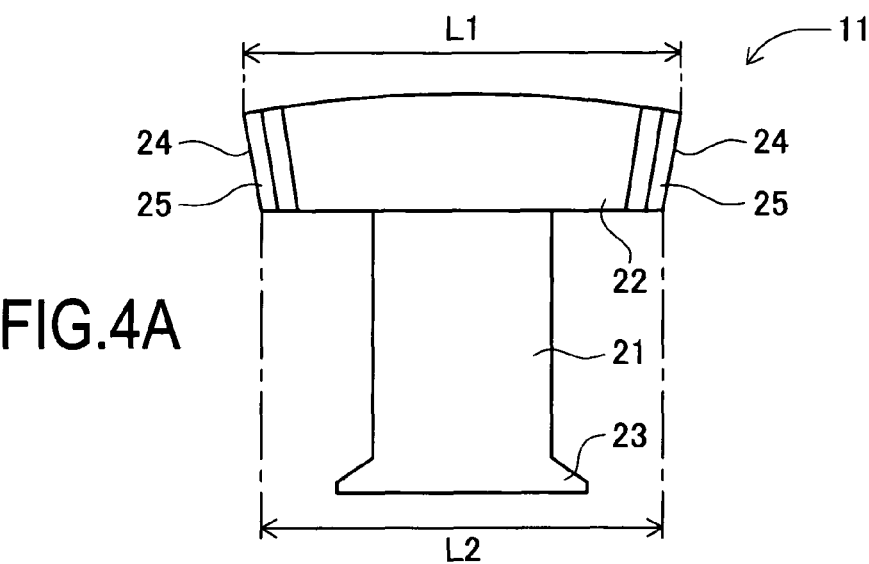
FIG. 4A is a plan view showing a core split member.
Figure 4B:
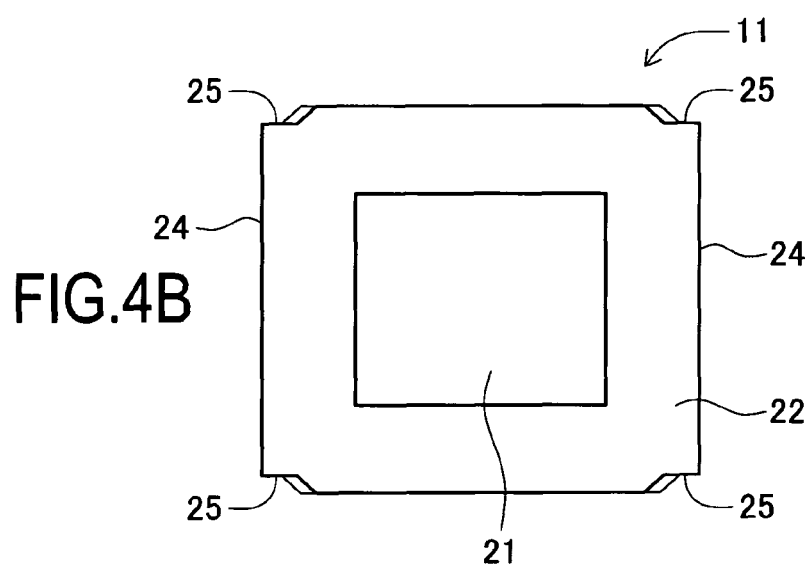
FIG. 4B is a front view showing the core split member.
Figure 4C:
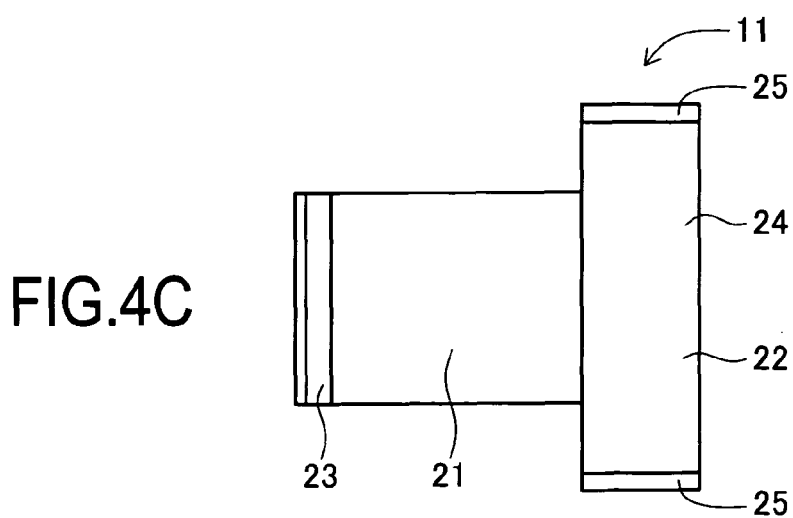
FIG. 4C is a side view showing the core split member.

Each core split member 11 of this embodiment is constituted by a tooth portion 21 and a yoke portion 22 that are integrally formed, as shown in FIGS. 4A to 4C. This core split member 11 is made of magnetic metal powder by a compression molding technique. The tooth portion 21 is a part on which a coil is wound in concentrated winding pattern to function as a core. Accordingly, a distal end portion 23 (a lower portion in FIG. 4A) is formed with a little wider width.

The yoke portion 22 of each core split member 11 is formed with a size entirely larger than the tooth portion 21 as shown in FIG. 4B. Each side surface 24 of the yoke portion 22 is a plane that is parallel to the axial direction and, if extended, contains the central axis. That is, as shown in FIG. 4A, each side surface 24 of the yoke portion 22 is formed to be oblique relative to the tooth portion 21 when viewed in the axial direction. The direction of inclination thereof is such a direction as to provide a width L1 of an upper part in the figure larger than a width L2 of a lower part in the figure. It is to be noted that, of the side surface 24, the upper portion in the figure is far from the central axis and the lower portion in the figure is close to the central axis.

Figure 1:
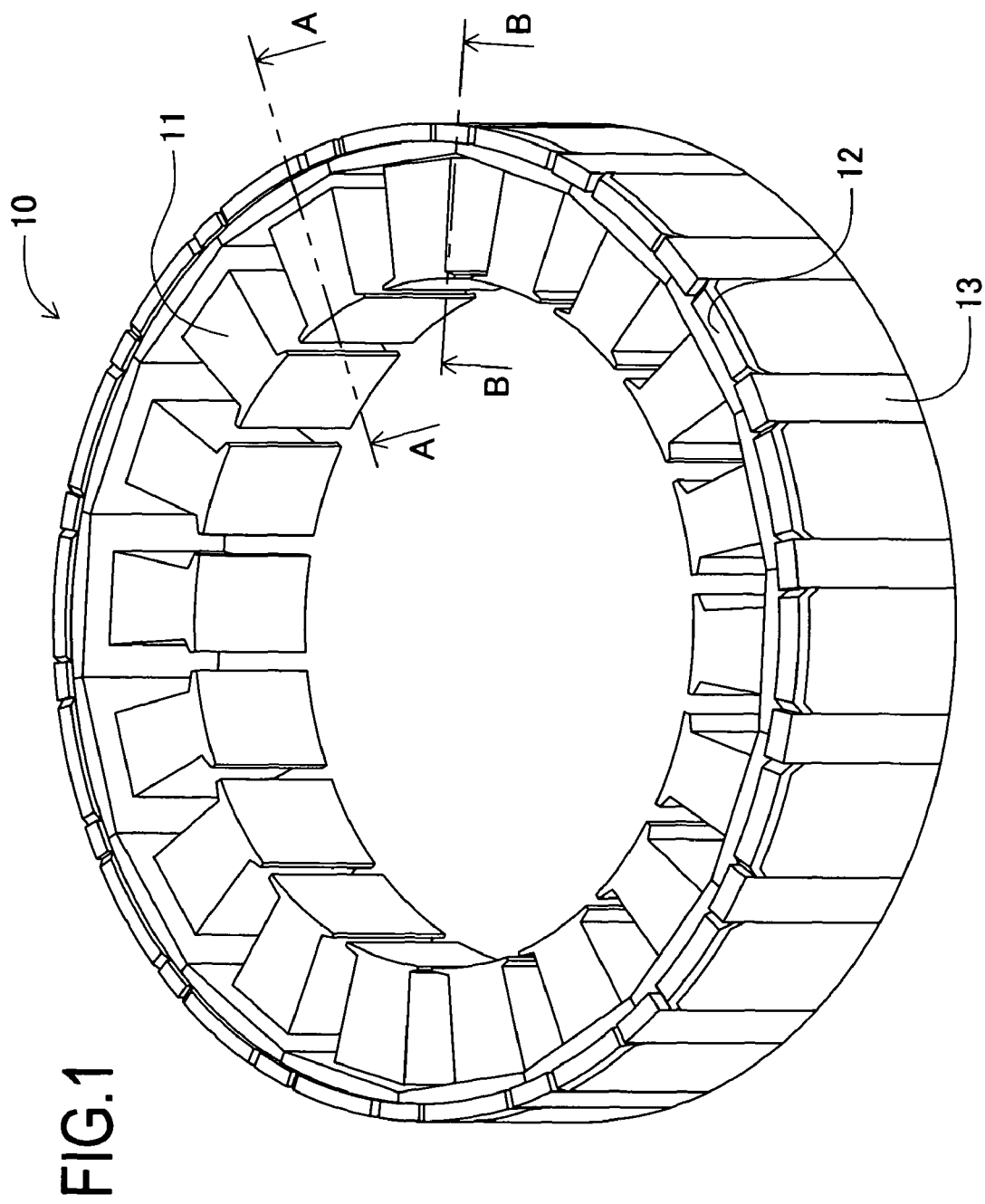
FIG. 1 is a perspective view showing a core of a preferred embodiment.

The predetermined number of core split members 11 are circumferentially arranged as shown in FIG. 1 and pressed against one another to bring together inward. Thus, the adjacent side surfaces 24 are made close contact with each other, forming the yoke portions 22 of the core split members 11 in a nearly annular shape. The outer surface (the upper surface in FIG. 4A) of the yoke portion 22 is formed in an arc shape. In an assembly shown in FIG. 1, accordingly, the outer surfaces of the yoke portions 22 form a nearly cylindrical surface. On the other hand, the tooth portions 21 are not in contact with each other even when the predetermined number of core split members 11 are circumferentially arranged as shown in FIG. 1. In this state, each tooth portion 21 protrudes toward the central axis. The shape of each side surface 24 of the yoke portions 22 is not limited to the above. It may be any shape if only the side surfaces 24 of the adjacent core split members 11 can come into close contact with each other so that the predetermined number of core split members 11 form the annular shape when circumferentially arranged and pressed together inward (in a direction closer to the central axis).

Figure 5:
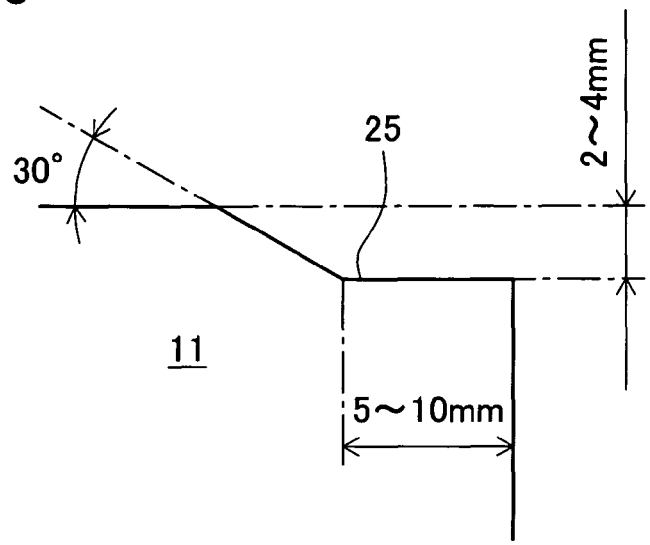
FIG. 5 is an explanatory view showing the details of the core split member.
Figure 6:
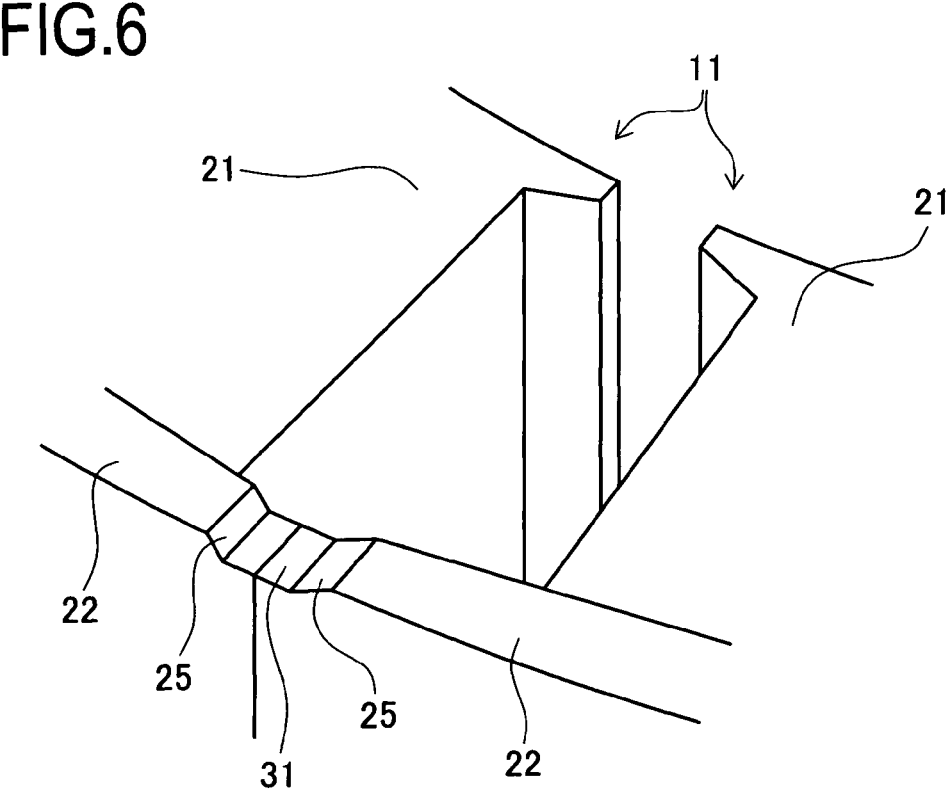
FIG. 6 is an explanatory view showing a state where the core split members are adjacently arranged.

Each core split member 11 of this embodiment is formed with grooves 25 at four corners of the yoke portion 22 as shown in FIGS. 4A to 4C. In this embodiment, the size of each groove 25 is about 2 mm to about 4 mm in depth, about 5 mm to about 10 mm in width, as shown in FIG. 5, and the side surface of each groove 25 is slant at about 30°. This groove 25 is formed in each end face of the yoke portion 22 in the axial direction and at each end in a circumferential direction. The groove 25 is oriented in a radial direction when the core split members 11 are circumferentially arranged as shown in FIG. 1. When the thus produced core split members 11 are circumferentially arranged as shown in FIG. 1, the side surfaces 24 of the yoke portions 22 are made contact with each other as mentioned above. Thus, the grooves 25 of the adjacent core split members 11 form one recess 31 as shown in FIG. 6. Each end face of the circumferentially arranged yoke portions 22 in the axial direction is of a corrugated shape consisting of flat portions and recesses 31 arranged alternately.

Figure 7A:
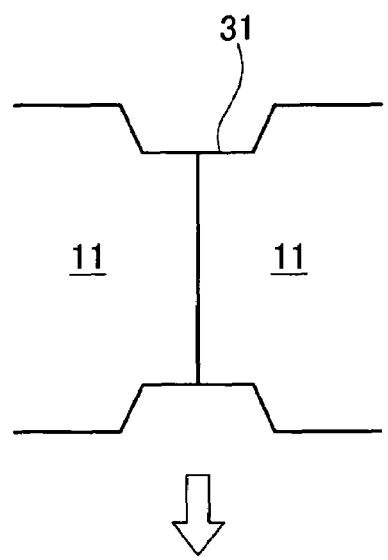
FIG. 7A is an explanatory view showing a fastening process.
Figure 7B:
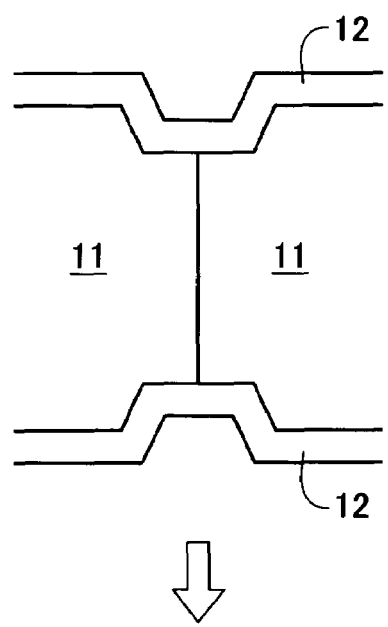
FIG. 7B is an explanatory view showing the fastening process.

The ring 12 is made of nonmagnetic metal such as stainless steel with a thickness of about 3 mm to about 5 mm. The ring 12 is a member shaped to be annular as a whole and conform to the end faces of the yoke portions 22 in the axial direction when the core split members 11 are circumferentially arranged as shown in FIG. 1. In other words, as shown in FIG. 7B, it is a wavy ring shape conforming to the corrugated shape defined by each end face of the yoke portions 22 in the axial direction and each recess 31 formed of the grooves 25. Accordingly, the corrugated shape of the yoke portions 22 meshes with the wavy shape of the ring 12. This makes it possible to prevent displacement between the ring 12 and the core split members 11 in the circumferential direction. Herein, the diameter of the ring 12 is determined to be slightly smaller than the outer diameter of the yoke portions 22 of the core split members 11 as shown in FIGS. 2 and 3. The width of the ring 12 in a radial direction is determined to be about half of the width of each yoke portion 22.

Figure 7C:
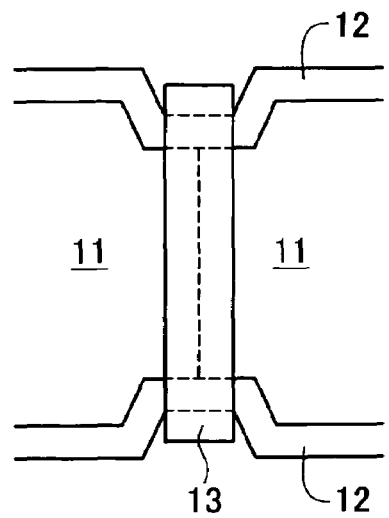
FIG. 7C is an explanatory view showing the fastening process.

Each stopper 13 is made of a material having somewhat elasticity such as nonmagnetic metal or resin. This is similar in length to the length of each yoke portion 22 in the axial direction as shown by a sectional view in FIG. 3. The stopper 13 is mounted so as to catch the rings 12 placed on both end faces of the core split members 11 in the axial direction. Each end of each stopper 13 is formed with a projection 32 which is nearly-triangular in section. This projection 32 is engaged with the inner side of the ring 12, thereby preventing the stopper 13 from coming off the ring 12. Such stoppers 13 are individually mounted on the boundaries of the core split members 11 over the outer periphery of the core 10. The rings 12 are thus fixed to the core 10. The width of the stopper 13 in a direction perpendicular to FIG. 3 is determined to be about the same as the width of the recess as shown in FIG. 7C.

That is to say, when these stoppers 31 are fitted on the recesses of the rings 12 as shown in FIG. 1, an engagement force acts in a direction to expand the diameter of each ring 12. A reaction force thereof pulls the stoppers 13 inward. Accordingly, the yoke portions 22 of the core split members 11 are pressed inward by the stoppers 13. At that time, the side surfaces 24 of the yoke portions 22, which are planes oriented toward the center, are made into close contact with each other when pressed inward by the stoppers 13. This can prevent inward displacement. The above configuration can reduce differences in stress applied to each core split member 11 even if the sizes of the core split members 11 are somewhat uneven. This is because all the stoppers 13 are engaged with the common ring 12 so that the forces exerted on the yoke portions 22 by the stoppers 13 are totally balanced.

Furthermore, the upper and lower rings 12 and the recesses 31 of the core split members 11 are fastened to each other by the stoppers 13. It is therefore possible to reliably prevent rotation displacement of the core split members 11 relative to the rings 12 in the circumferential direction. Displacement of the rings 12 and each core split member 11 in the axial direction can also be prevented by the stoppers 13. Consequently, the positional displacement of each core split member 11 is prevented by the rings 12 and the stoppers 13.

Reversely, even if a slight gap is formed between each ring 12 and each core split member 11, the displacement of each core split member 11 in the axial direction is prevented. The rotation of each core split member 11 relative to each ring 12 is also restrained. Alternatively, the displacement and the rotation are precluded even if a little gap is generated between each stopper 13 and each ring 12. According to this method, the core split members 11 do not need to be fastened extremely strongly. Thus, excessive stress will not be exerted on the core split members 11. The outer periphery of the core 10 shown in FIG. 1 appears as a smooth curved surface in the figure but really each stopper 13 protrudes outside from the outer periphery of the core 10.

The use of the core 10 of this embodiment in a rotating electrical machine such as a motor, a power generator, and the like will not deteriorate hysteresis loss because no stress is applied to the core split members 11. There is also no risk of damaging each core split members 11 even by thermal cycles in use. Since the core split members 11 are unlikely to be displaced from one another, a rotating electrical machine capable of providing an appropriate magnetic flux can be realized.

An explanation will be given to a production method of the core 10 of the present invention. A production method of each core split member 11 is first explained. As raw powder, Fe—Si atomized powder having a powder particle diameter of 75 to 350 μm is used. This is left stand in vacuum at 1100° C. for three hours for powder annealing. Subsequently, 0.2 to 0.5 wt % of silicone resin is added to that powder, and then the mixture is stirred and dried. By use of a warm compaction method with die lubrication, it is molded under a surface pressure of 1200 to 1600 MPa. Finally, an N2 atmosphere treatment is conducted at 600° C. to 750° C. for 30 minutes to finish each core split member 11. In addition, the required number of rings 12 and stoppers 13 are also produced.

Subsequently, coils are individually wound on the required number of core split members 11, which are then circumferentially arranged as shown in FIG. 1. The yoke portions 22 of the core split members 11 are thus made contact with each other, forming the recesses 31 as shown in FIG. 7A. The rings 12 are placed on and under the circumferentially arranged core split members 11. The rings 12 each made in conformity to the shape of the yoke portions 22 of the core split members 11 are just fitted on the recesses 31 as shown in FIG. 7B. Actually, it is preferable to dispose the core split members 11 on the lower ring 12 and then overlay the other ring 12 thereon.

As shown in FIG. 7C, thereafter, each stopper 13 is mounted in the upper and lower recesses 31 in the axial direction. The stopper 13 is fitted by its own elastic force, making the projections 32 at the ends be engaged with the inner side of the rings 12. This prevents the stopper 13 from coming off. When the stoppers 13 are mounted in all the recesses 31 of the circumferential core split members 11, the core 10 is completed.

According to the core 10 of the present embodiment, as mentioned above in detail, when the plurality of core split members 11 are circumferentially arranged, the grooves 25 of the core split members 11 form the recesses 31. The rings 12 conforming to the shape of the recesses 31 are placed on both end faces of the circumferentially arranged core split members 11 in the axial direction. Furthermore, one stopper 13 grasps the upper and lower recesses 31 in the axial direction. The core split members 11, the rings 12, and the stoppers 13 will not be displaced relative to one another even when they are not fastened firmly. Consequently, the core 10 constituted by the circumferentially arranged and fastened core split members 11 can be prevent stress generation and positional displacement between the core split members.

The above embodiment is merely an example and does not add any limitations to the present invention. The present invention may therefore be embodied in other specific forms without departing from the essential characteristics thereof.

For instance, the groove 25 does not have to be positioned at each corner of the yoke portion 22 and to be as long as the entire thickness of the yoke portion 22. Even either one of the rings 12 has only to be provided. The ring 12 may be configured to further mesh with the outer periphery of the yoke portion 22.

Alternatively, it can be realized by providing a protrusion in a core split member, placing a ring conforming to the shape thereof, and mounting a stopper to grasp the protrusion from either side thereof. In other words, each core split member has to be formed with at least one protrusion or recess with which a ring confirming to the shape thereof and a stopper can engage. Moreover, the yoke portion 22 may be formed on its outer periphery with a groove extending in the axial direction in conformity to the stopper 13 to produce the core 10 of a cylindrical shape with a smooth outer periphery. The above embodiment exemplifies the core split member 11 made of magnetic metal powder by compression molding, but may be applied to a laminated steel sheet type of a core split member that is made of laminated magnetic steel sheets.

INDUSTRIAL APPLICABILITY

The present invention can provide a rotating electrical machine incorporating a rotating electrical machine core including the core split members circumferentially arranged and fastened, that is, a rotating electrical machine that prevents stress generation and positional displacement between the core split members.

The invention claimed is:

1. A rotating electrical machine core including a plurality of core split members each having a yoke portion and a tooth portion, the core split members being circumferentially arranged so that the tooth portions are oriented inward and the yoke portions contact each other, the rotating electrical machine core comprising:

a ring placed in contact with end faces of the yoke portions; and a stopper mounted on an outer periphery of the yoke portion to fix the ring to the yoke portion, wherein each yoke portion and the ring are formed in protrusion and recess shapes in an axial direction that mesh with each other, and the stopper is formed with a projection engaged with an inner side of the ring.

2. The rotating electrical machine core according to claim 1, wherein the stopper is mounted in a place corresponding to the recess of the yoke portion.

3. A rotating electrical machine incorporating a rotating electrical machine core including a plurality of core split members each having a yoke portion and a tooth portion, the core split members being circumferentially arranged so that the tooth portions are oriented inward and the yoke portions contact each other, the rotating electrical machine core comprising:

a ring placed in contact with end faces of the yoke portions; and a stopper mounted on an outer periphery of the yoke portion to fix the ring to the yoke portion, wherein each yoke portion and the ring are formed in protrusion and recess shapes in an axial direction that mesh with each other, and the stopper is formed with a projection engaged with an inner side of the ring.

4. The rotating electrical machine according to claim 3, wherein the stopper is mounted in a place corresponding to the recess of the yoke portion.

\* \* \* \* \*